May 2, 1961 A. U. I. VEGEBY 2,982,606
COMBUSTION OF WASTE LIQUORS
Filed March 14, 1956 2 Sheets-Sheet 1
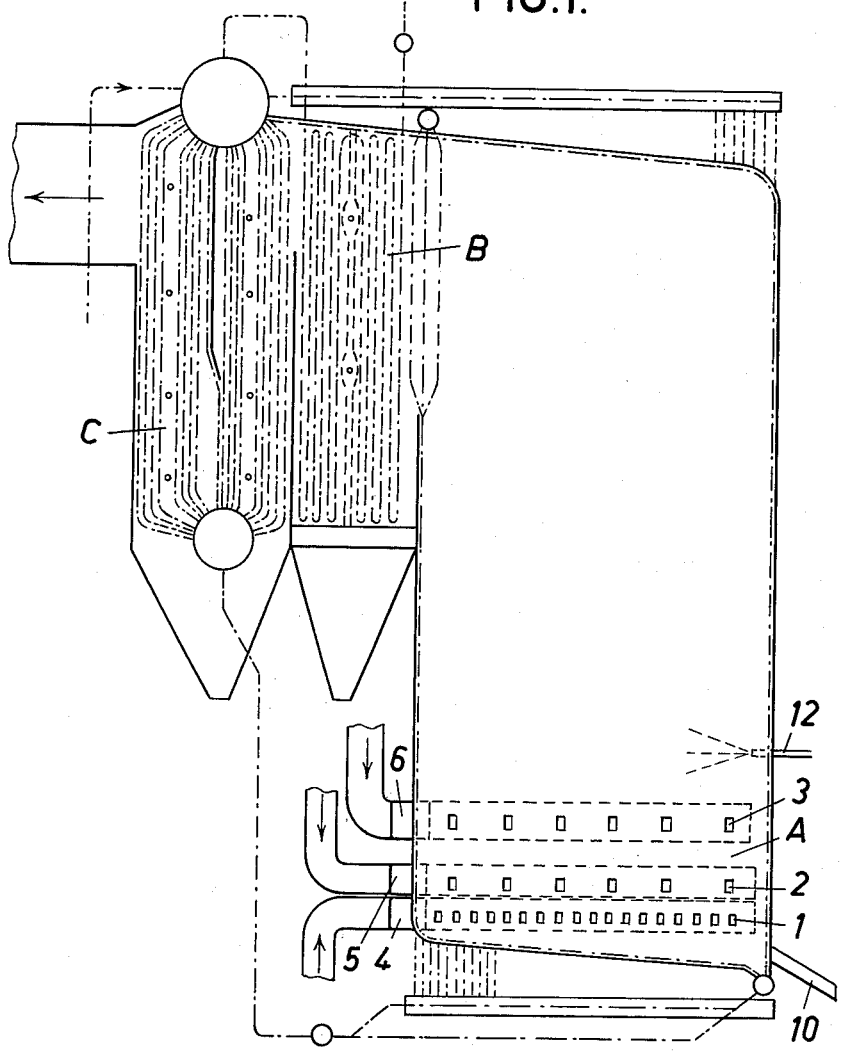

May 2, 1961 A. U. I. VEGEBY 2,982,606
COMBUSTION OF WASTE LIQUORS
Filed March 14, 1956 2 Sheets-Sheet 2
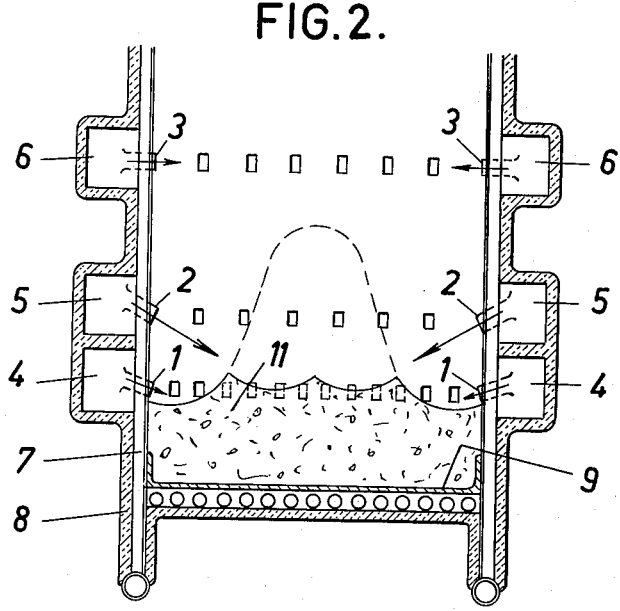
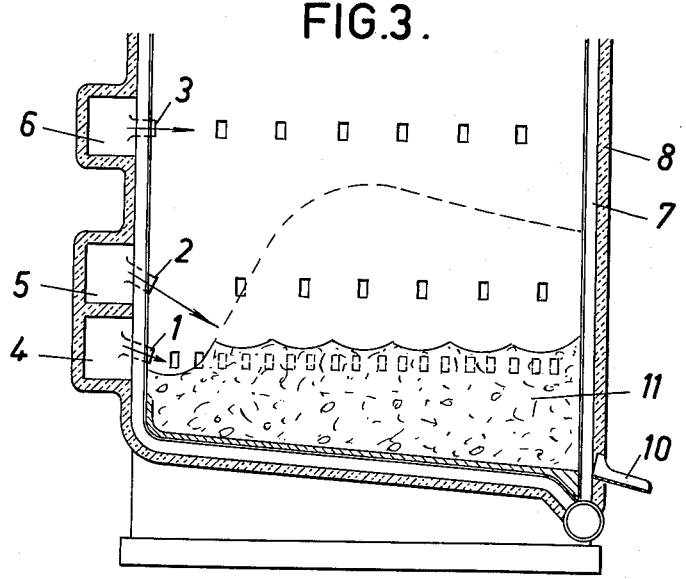
Inventor
Anders U.I. Vegeby
by Sommers & Young
Attorneys United States Patent Office 2,982,606
Patented May 2, 1961

2,982,606

COMBUSTION OF WASTE LIQUORS

Anders Uno Ingvar Vegeby, Sollentuna, near Stockholm, Sweden, assignor to Aktiebolaget Götaverken, Goteborg, Sweden Filed Mar. 14, 1956, Ser. No. 571,476

Claims priority, application Sweden Mar. 17, 1955

5 Claims. (Cl. 23—48)

The present invention relates in general to the combustion of waste liquors containing combustible organic matter and inorganic chemicals, and more particularly to a method and means for supplying the air of combustion to a furnace for burning such waste liquors.

In the combustion of residual or "black" liquor from the pulp digesters used in the sulphate or "kraft" pulp industry, for example, the liquor, with a view to recovering chemicals therein and heat in the form of steam, is generally, in well known manner partly evaporated and injected into a furnace in such a way that a greater or lesser portion of the black liquor adheres to the walls of the furnace and a portion of the black liquor falls down directly on a bed of dried black liquor at the bottom of the furnace, whereas a minor portion thereof is entrained by the flue gases flowing upwards through the furnace. The black liquor adhering to the walls is dried by the contact with the combustion gases formed in the combustion of the combustible matter of the black liquor, which combustion takes place partly in the lower portion of the furnace and partly at a higher level in the furnace, in an area of final combustion after supply of secondary air.

The chemicals recovered are withdrawn in molten form through a spout at the bottom of the furnace. In addition a minor amount of chemicals entrained by the flue gases is recovered and added to the black liquor before the liquor is injected in the furnace. For the recovery of heat in the form of steam the furnace is generally provided with water-cooled walls, and convection heat transfer surfaces are arranged after the furnace.

The combustion in the furnace is brought about by supplying air of relatively low pressure (primary air) in the immediate vicinity of the bed through a set of nozzles arranged either in all walls around the furnace or only in some of the walls, for instance, the side walls and the rear wall. By the contact between the primary air and the fuel in the bed at the bottom of the furnace a relatively narrow combustion zone is obtained extending along the walls in front of the nozzles. In the center of the horizontal cross-section of the furnace no combustion occurs since all the oxygen of the primary air has been consumed when said air reaches the center of the furnace. Thus the bed takes the form of a heap. The gases formed in the combustion of the primary air contain considerable amounts of unburned matter which then is burned by means of secondary air.

Due to the fact that the combustion zone around the primary air nozzles does not extend over the whole cross-section of the furnace the combustion will take place over a relatively small surface whereby the heat evolved per surface unit is very high. This is disadvantageous as the radiation from the combustion zone on account of the relativelly small surface is small and a higher temperature is obtained than if the combustion were to take place over the whole cross-section of the furnace. Since the bed contains dissolved metal salts, the vapor pressure of which rapidly increases with increasing temperature, a large evaporation of said salts occurs, which salts must be recovered from the flue gases. Moreover the final drying of the fuel is effected at a very high temperature, whereby the remaining moisture is expelled from the fuel very rapidly and hence easily entrains relatively large fuel particles. As said fuel particles are not burned in the final combustion zone and as metal salts are present to a large extent in the flue gases, troublesome deposits are created on the convection heat transfer surfaces after the furnace.

It is therefore a principal object of my invention to provide an improved method and apparatus whereby the primary combustion of the fuel bed in a furnace of the character described is extended over the whole cross-section of the furnace.

Another object of this invention is to reduce the temperature in the combustion zone whereby the evaporation of metal salts and the presence of entrained fuel particles in the combustion gases is kept at a minimum.

A further object of the invention is to provide for an increase of the capacity of already existing furnaces for the combustion of waste liquors.

The novel features which are characteristic of the invention are set forth in particular in the appended claims. For a better understanding of the invention, its operating advantages and specific objects attained by its use, reference is made to the accompanying drawings and descriptive matter, in which I have illustrated and described a preferred embodiment of my invention.

In the drawings:

Fig. 1 is a schematic sectional elevation of a unit for recovering heat and chemicals from waste effluents;

Fig. 2 is an enlarged view of the furnace section of the unit of Fig. 1;

Fig. 3 is an enlarged view similar to Fig. 2 but taken at right angles thereof.

The unit shown comprises a furnace section A, a steam superheating section B, and a stream generating section C, which are serially connected in the order named.

Referring particularly to Figs. 2 and 3 of the drawings the furnace comprises walls of water-cooled tubes 7 which on their outside are surrounded by a suitable heat insulating cover 8. The fuel, which can be assumed to consist of partially evaporated black liquor, is sprayed through one or several nozzles 12 into the furnace, wholly or partly against the walls of the furnace, where the black liquor adheres and is dried by contact with the ascending combustion gases. Then the black liquor in a more or less dried condition falls to the bottom of the furnace forming a bed 11 of solid fuel. The bottom of the furnace has a refractory lining 9, and, at the front of the furnace, just over the furnace bottom, one or a plurality of spouts 10 for the withdrawal of molten salts formed in the combustion of the black liquor.

Primary air for the combustion of the bed is supplied in the immediate vicinity of the bed. To this end two groups of primary air nozzles 1 and 2, respectively, are mounted in the side walls and rear wall of the furnace and supplied with primary air from wind-boxes 4 and 5, respectively. The nozzles 1 correspond to those provided in known furnaces of this kind, and are arranged to direct the primary air mainly against the sides of the fuel bed. If the primary air were supplied only through said nozzles 1 the combustion would be concentrated to a narrow zone around the bed, which would take the shape indicated by the dotted line in Figs. 2 and 3. However, the further primary air nozzles 2 provided according to this invention are adapted to direct primary air also against the central area of the surface of the bed 11 and to cause the combustion zone to extend over the whole cross-section of the furnace, while the top in the middle of the bed is burned away and the bed is given the shape indicated by the full lines in Figs. 2 and 3. Preferably, the pressure in the wind-boxes 5 is kept higher than that in the wind-boxes 4, whereby the air jets from the nozzles 2 will have a higher velocity than the air jets from the nozzles 1, and, thus, will penetrate the gaseous layer over the combustion zone in front of the nozzles 1.

Due to the extension of the combustion zone and since the amount of heat generated in the combustion zone is the same as in a known furnace of the same size but provided with only one group of primary air nozzles corresponding to the nozzles 1, a lower temperature in the bed is obtained, which results in a substantially lower degree of volatilization or sublimation of the chemicals. Moreover, the drying of the fuel is effected under a smaller increase in the temperature whereby the drying will occur more smoothly and take a more favorable course with a smaller amount of entrained fuel particles in the flue gases.

The combustion of unburned matter in the combustion gases is effected in a known manner by supplying secondary air through the wind-box 6 and one or several groups of secondary air nozzles 3 in the upper portion of the furnace.

By supplying the primary air in accordance with the present invention two possibilities of changing the operation in already existing units of this general type are obtained. On one hand the temperature of combustion over the fuel bed at the bottom of the furnace can be reduced relative to the previously obtained combustion temperatures with a consequent reduction in the amount of entrained fuel particles in the gases and the evaporation of metal salts, and on the other hand the capacity of the furnace can be increased to the same extent as the size of the combustion zone is increased, if the generally existing conditions of combustion are permissible. At the same time it is attained that between the fuel bed and the area of final combustion adjacent to the secondary air nozzles there are over the whole space combustion gases having a composition which can be controlled by the primary air supply within a larger height than was formerly possible with the high heap of fuel in the center of the bed.

While I have illustrated and described herein the best form of my invention now known to me, those skilled in the art will understand that changes may be made in the form of the apparatus and operation of the process disclosed without departing from the spirit of the invention covered by my claims.

I claim:
1. A method of supplying the air of combustion to furnaces for burning in a reducing atmosphere waste liquors containing combustible organic matter and inorganic salts comprising spraying the liquor into the furnace in intimate contact with an ascending stream of combustion gases; distributing the partially dehydrated liquor residues over the bottom of the furnace to form a fuel bed; burning said residues by means of primary air supplied in sufficient quantity in relation to the waste liquor supply to maintain the reducing atmosphere whereby the inorganic salts are recovered and withdrawn in molten form; dividing said primary air into two streams; directing a first stream of air through a first set of nozzles arranged immediately above the surface of the bed against the side portions of the surface of the bed; and extending the combustion zone over the whole cross-sectional area of the furnace and maintaining the fuel bed approximately constant and level, and causing the burning to take place at lower temperature and the vapor pressure of the inorganic salts to be lower and less vaporization of said salts to occur than if the total amount of primary air were supplied at one level, and the final drying of the fuel to occur more slowly whereby organic material entrained by vaporized moisture is reduced by directing a second stream of said primary air through a second set of downwardly inclined nozzles, arranged above said first set of nozzles, against the central portion of the surface of the bed in predetermined quantities.

2. A method of supplying the air of combustion to furnaces for burning waste liquors containing combustible organic matter and inorganic salts, in which the liquor is sprayed into the furnace in intimate contact with an ascending stream of combustion gases, partially dehydrated liquor residues being distributed over the horizontal bottom of the furnace to form a fuel bed, and said residues are burned by means of primary air supplied in sufficient quantity in relation to the waste liquor supply to maintain a reducing atmosphere whereby the inorganic salts are recovered and withdrawn in molten form, comprising dividing the primary air into two streams, directing a first stream at a relatively low pressure through a first set of nozzles arranged immediately above the surface of the bed against the side portions of the surface of the bed, and directing a second stream at a relatively high pressure through a second set of downwardly inclined nozzles arranged above said first set of nozzles against the central portion of the surface of the bed in balanced quantities to extend the combustion zone over the whole cross-sectional area of the furnace and to maintain the fuel bed constant and level whereby the temperature at which the burning takes place can be lower and the vapor pressure of the inorganic salts is lower than if all the air were supplied at one level so that less vaporization of said salts occurs, and the final drying of the fuel occurs more slowly whereby less organic material is entrained by vaporized moisture.

3. A method of supplying the air of combustion of furnaces for burning in a reducing atmosphere waste liquors containing combustible organic matter and inorganic salts, comprising spraying the liquor into the furnace in intimate contact with an ascending stream of combustion gases, distributing partially dehydrated liquor residues over the bottom of the furnace to form a fuel bed, burning said residues by supplying primary air in sufficient quantity in relation to the waste liquor supply to maintain a reducing atmosphere, recovering the inorganic salts in molten form; dividing the primary air into two streams; directing a first stream of said air through a first set of nozzles arranged immediately above the surface of the bed against the side portions of the surface of the bed; extending the combustion zone over the whole cross-sectional area of the furnace and maintaining the fuel bed approximately constant and level, and the temperature at which the primary burning takes place is lower and the vapor pressure of the inorganic salts is lower than if all the primary air were supplied at one level by directing a second stream of primary air through a second set of downwardly inclined nozzles arranged above said first set of nozzles against the central portion of the surface of the bed in predetermined quantities so that less vaporization of said salts occurs, and the final drying of the fuel occurs more slowly whereby less organic material is entrained by vaporized moisture, and burning unburned matter in the ascending stream of combustion gases, thus obtained, by supplying secondary air to the upper portion of the furnace.

4. Apparatus for recovering chemicals and heat from waste liquors containing combustible matter and inorganic salts, comprising a furnace chamber of the vertical shaft type, spray means for introducing liquor in a substantially horizontal direction across said furnace chamber, a hearth at the bottom of the furnace chamber for receiving partially dehydrated liquor residues to form a fuel bed therein, means for supplying combustion air to said bed in sufficient quantities in relation to the waste liquor supply to maintain a reducing atmosphere, including a first series of primary air nozzles in the furnace walls for directing streams of primary air against the side portions of the surface of the bed, a second series of downwardly inclined primary air nozzles in the furnace walls for directing streams of primary air against the central portions of the surface of said bed in predetermined quantities to extend the combustion zone over the whole cross-sectional area of the furnace and to maintain the fuel bed substantially constant and level, and a series of secondary air nozzles located in the upper portions of the furnace walls at a level between said bed and said spray means, a gas outlet from the upper portion of the furnace chamber and an outlet for the inorganic salts at the bottom of said furnace chamber for recovering and withdrawing said salts in molten form.

5. Apparatus for recovering chemicals and heat from waste liquors containing combustible matter and inorganic salts, comprising a furnace chamber of the vertical shaft type, spray means for introducing liquor in a substantially horizontal direction across said furnace chamber, a hearth at the bottom of the furnace chamber for receiving partially dehydrated liquor residues to form a fuel bed therein, means for supplying combustion air to said bed in sufficient quantities in relation to the waste liquor supply to maintain a reducing atmosphere, including a first series of primary air nozzles in the furnace walls for directing streams of primary air against the side portions of the surface of the bed, a second series of downwardly inclined primary air nozzles in the furnace walls for directing streams of primary air against the central portions of the surface of said bed in predetermined quantities to extend the combustion zone over the whole cross-sectional area of the furnace and to maintain the fuel bed substantially constant and level, and a series of secondary air nozzles located in the upper portions of the furnace walls, a gas outlet from the upper portion of the furnace chamber and an outlet for the inorganic salts at the bottom of said furnace chamber for recovering and withdrawing said salts in molten form.

References Cited in the file of this patent

UNITED STATES PATENTS

| 2,050,400 | Wagner | Aug. 11, 1936 |
| 2,114,619 | Ward | Apr. 19, 1938 |
| 2,213,052 | Rosencrants et al. | Aug. 27, 1940 |
| 2,294,242 | Rohrer | Aug. 25, 1942 |
| 2,789,881 | Hochmuth | Apr. 23, 1957 |

FOREIGN PATENTS

| 902,770 | Germany | Jan. 28, 1954 |
| 916,972 | Germany | Aug. 23, 1954 |